United States Patent [19]
Kohlhammer et al.

[11] Patent Number: 5,977,244
[45] Date of Patent: Nov. 2, 1999

[54] POWDERED CROSSLINKABLE TEXTILE BINDER COMPOSITION

[75] Inventors: Klaus Kohlhammer, Marktl; Richard Goetze; Reinhard Haerzschel, both of Burghausen; Abdulmajid Hashemzadeh, Gurgkirchen, all of Germany

[73] Assignee: Wacker-Chemie GmbH Hanns-Seidel-Platz 4, Munich, Germany

[21] Appl. No.: 09/126,456

[22] Filed: Jul. 29, 1998

[30] Foreign Application Priority Data

Jul. 31, 1997 [DE] Germany .......................... 197 33 133

[51] Int. Cl.⁶ .............................. C08J 3/00; C08K 3/20; C08L 75/00; C08F 283/04
[52] U.S. Cl. ...................... 524/589; 156/283; 156/330; 156/330.9; 156/331.1; 156/331.4; 156/331.7; 427/385.5; 427/381; 427/389; 427/389.9; 428/109; 428/402; 524/507; 524/590; 525/107; 525/123; 525/129; 525/455; 525/396
[58] Field of Search ...................... 524/589, 507, 524/590; 525/107, 123, 129, 455, 396; 156/283, 330, 330.9, 331.1, 331.4, 331.7; 428/109, 402; 427/372.2, 385.5, 381, 389, 389.9

[56] References Cited

U.S. PATENT DOCUMENTS

| | | |
|---|---|---|
| 4,129,545 | 12/1978 | Sunamori et al. . |
| 4,451,315 | 5/1984 | Miyazaki . |
| 4,612,224 | 9/1986 | Davis . |
| 4,943,612 | 7/1990 | Morita et al. . |
| 5,207,954 | 5/1993 | Lewis et al. .............................. 264/13 |

FOREIGN PATENT DOCUMENTS

| | | |
|---|---|---|
| 3665989 | 4/1990 | Australia . |
| 0164554 | 12/1985 | European Pat. Off. . |
| 0590702 | 4/1994 | European Pat. Off. . |
| 0721004 | 7/1996 | European Pat. Off. . |
| 0731207 | 9/1996 | European Pat. Off. . |
| 7702854 | 9/1977 | France . |
| 9014457 | 11/1990 | WIPO . |
| 9222603 | 12/1992 | WIPO . |
| 9420661 | 9/1994 | WIPO . |
| 9742367 | 11/1997 | WIPO . |

OTHER PUBLICATIONS

Polymer Handbook, 2nd Edition, J. Wiley & Sons, New York (1975), pp. III 139ff.

Derwent Abstract Corresponding to FR 7702854, AN 77–57812Y.

Derwent Abstract Corresponding to EP 0731207, AN 96–404018.

*Primary Examiner*—Patrick D. Niland
*Attorney, Agent, or Firm*—Burgess, Ryan & Wayne

[57] ABSTRACT

The invention provides a powdered crosslinkable textile binder composition for producing polymer bonded textile moldings or sheet materials, comprising a) a powdered copolymer obtainable by emulsion polymerization and subsequent drying of one or more monomers selected from the group consisting of vinyl esters, acrylic esters, methacrylic esters, vinylaromatics and vinyl chloride and of 0.01 to 25% by weight, based on the total weight of the copolymer, of one or more ethylenically unsaturated carboxyl-containing monomers, the copolymer having a glass transition temperature Tg or a melting point of greater than 40° C. and a molecular weight Mw of 60,000 to 300,000, and b) at least one powdered compound having two or more epoxide or isocyanate groups and a melting point of 40° C. to 150° C.

13 Claims, No Drawings

POWDERED CROSSLINKABLE TEXTILE BINDER COMPOSITION

BACKGROUND OF THE INVENTION

1) Field of the Invention

The present invention relates to a powdered crosslinkable textile binder composition and also to processes for producing polymer bound textile moldings or sheet materials using the textile binder composition.

2) Background Art

Textile sheet materials produced by the customary methods for producing nonwovens, for example by the airlay, wetlay or spunlay process, require a binder for durable binding of the fibers and for increasing the resistance to mechanical stress. These binders are customarily based on synthetic macromolecular compounds and, in the prior art, can be applied either in the form of solids, for example as powder, granulate or fiber, or in the form of liquids, for example as aqueous polymer dispersion or solution. The increased strength of the nonwovens is due to the bonding of the fibers by the polymers which adhere to the fiber and so reinforce the fibrous structure.

WO-A 90/14457 discloses a process wherein carded glass fibers are mixed with thermoplastic powder, for example polypropylene, polyester or polyamide, and the fibrous structure is subsequently consolidated at elevated temperature and under pressure. AU-B 36659/89 likewise describes a process for consolidating glass fiber materials by means of thermoplastic powders. The use of powders based on polyester or polystyrene is recommended. The low strength of the thus-bonded fibrous structures on contact with water or solvents is disadvantageous.

Since the glass transition temperatures or the melting temperatures of the binders are frequently exceeded at elevated temperatures, durable chemical crosslinking of the binders is required in order that a high temperature dimensional stability is given to the fibrous structures. Processes are known for consolidating fiber materials composed of polyester, polyamide or cotton fibers using self-crosslinking polymer dispersions (U.S. Pat. No. 4,451,315). True, nonwovens of high strength are obtained, but the use of aqueous binders is prohibitively costly on the drying side. In addition, it is not a straightforward matter to disperse the binder in the fiber matrix.

U.S. Pat. No. 4,612,224 describes the consolidation of powdered crosslinkable copolymers based on phenolformaldehyde resins. The disadvantage with this binder system is the high amount of formaldehyde emitted in the course of the production and use of the fiber materials thus consolidated.

WO-A 94/20661 describes self-crosslinking redispersible dispersion powders based on vinyl ester copolymers or (meth)acrylic ester copolymers as fiber bonding agents. The disadvantage with this binder system is that setting requires an appreciable input of water into the fiber matrix, entailing costly drying.

U.S. Pat. No. 4,129,545 describes thermosetting copolymers based on acrylic esters and/or vinyl esters and additionally containing (meth)acrylic esters of mono- or polyfunctional hydroxycarboxylic acids and N-alkoxyalkyl (meth)acrylamide as crosslinking component for use as a powder paint. EP-A 721004 discloses crosslinkable water-dispersible powders including both filming polymers having at least one functional group and reactive components which form covalent bonds on dispersion of the powders in water. Aqueous dispersions of the powder composition are used for producing water resistant coatings.

SUMMARY OF THE INVENTION

It is an object of the present invention to provide a textile binder avoiding the disadvantages of prior art binders such as insufficient strength, high drying requirements, poor flow characteristics and nonuniform dispersement of the binder.

This object is achieved by a powdered crosslinkable textile binder composition for producing polymer bonded textile moldings or sheet materials, comprising a) a powdered copolymer obtainable by emulsion polymerization and subsequent drying of one or more monomers selected from the group consisting of vinyl esters, acrylic esters, methacrylic esters, vinylaromatics and vinyl chloride and of 0.01 to 25% by weight, based on the total weight of the copolymer, of one or more ethylenically unsaturated carboxyl-containing monomers, the copolymer having a glass transition temperature Tg or a melting point of greater than 40° C. and a molecular weight Mw of 60,000 to 300,000, and b) at least one powdered compound having two or more epoxide or isocyanate groups and a melting point of 40° C. to 150° C.

DESCRIPTION OF THE PREFERRED EMBODIMENT

Suitable copolymers are copolymers based on one or more monomers selected from the group comprising vinyl esters of unbranched or branched alkylcarboxylic acids having 1 to 15 carbon atoms, methacrylic esters and acrylic esters of alcohols having 1 to 10 carbon atoms, vinylaromatics such as styrene and vinyl chloride. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 or 9 carbon atoms, for example VeoVa5® or VeoVa9® (trademarks of the Shell Corporation). Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate.

It is essential that the composition of the copolymer is chosen so as to produce a glass transition temperature Tg or a melting point of greater than 40° C., preferably of 55° C. to 150° C. The glass transition temperature Tg and the melting point of the polymers can be determined in a conventional manner by means of differential scanning calorimetry (DSC). The Tg can also be estimated in advance by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of monomer n and $Tg_n$ is the glass transition temperature in degrees Kelvin of the homopolymer of monomer n. Tg values for homopolymers are recited in Polymer Handbook $2^{nd}$ Edition, J. Wiley & Sons, New York (1975).

For a uniform dispersement of the binding powder in the fibrous structure, the binding powder has to have a low melt viscosity. The melt viscosity of the binding powder is determined by the average molecular weight Mw and the molecular weight distribution Mw/Mn of the copolymer. The weight average molecular weight Mw is between 60,000 and 300,000. The molecular weight and the molecular weight distribution can be adjusted in a conventional manner during the polymerization, for example through the use of chain transfer agents and via the polymerization temperature, and can be measured by means of gel permeation chromatography (GPC).

Preferred copolymers are vinyl acetate/vinyl chloride, vinyl acetate/VeoVa5®, vinyl acetate/VeoVa9®, methyl methacylate/butyl acrylate and styrene/butyl acrylate copolymers which each contain 0.01 to 25% by weight of the carboxyl-containing monomer units mentioned, and whose composition is chosen so as to produce the abovementioned glass transition temperatures Tg or melting points.

Suitable ethylenically unsaturated carboxyl-containing monomers are ethylenically unsaturated mono- or dicarboxylic acids such as acrylic acid, methacrylic acid, maleic acid, fumaric acid, itaconic acid. Carboxyl-containing comonomer units are preferably present in an amount of 0.01 to 10% by weight, based on the total weight of the copolymer.

If desired, the copolymers may further contain 0.01 to 10.0% by weight, based on the total weight of the copolymer, of auxiliary monomers from the group of the ethylenically unsaturated carboxamides, preferably acrylamide, from the group of the ethylenically unsaturated sulfonic acids and salts thereof, preferably vinylsulfonic acid, from the group of the multiply ethylenically unsaturated comonomers, for example divinyl adipate, diallyl maleate, allyl methacrylate or triallyl cyanurate, and/or from the group of the N-methylol(meth)acrylamides and also their ethers such as isobutoxy or n-butoxy ether.

In a preferred embodiment, the copolymers contain 0.01 to 2% by weight of each of acrylic acid and/or acrylamide.

The copolymers are prepared in a conventional manner, preferably by the emulsion polymerization process, as described, for example, in WO-A 94/20661, whose disclosure in this respect is incorporated herein by reference. The polymer dispersion obtainable thereby is dried to produce the powder. The drying can be effected by means of spray drying, freeze drying or by coagulation of the dispersion and subsequent fluidized bed drying. Spray drying is preferred. Preferably, the copolymer is prepared and dried without the addition of protective colloid.

Suitable crosslinkers are powdered compounds which have two or more epoxide or isocyanate groups and a melting point of 40° C. to 150° C. Examples of suitable epoxide crosslinkers are those of the bisphenol A type, i.e., condensation products of bisphenol A and epichlorohydrin or methylepichlorohydrin. Suitable epoxide crosslinkers are commercially available, for example under the trade names of Epicote or Eurepox. Suitable diisocyanates are likewise common commercial products, for example m-tetramethylxylene diisocyanate (TMXDI), methylenediphenyl diisocyanate (MDI). The proportion of crosslinker generally ranges from 0.1 to 25% by weight, preferably from 4 to 12% by weight, based on the powdered copolymer.

In a preferred embodiment, the crosslinkable textile binder composition further comprises a crosslinking catalyst. Examples of suitable crosslinking catalysts are powdered catalysts derived from triphenylphosphonium halides or quaternary ammonium compounds. Examples thereof are methyl-, ethyl-, propyl-, butyl-triphenylphosphonium bromide and the corresponding iodides and chlorides. It is also possible to use triphenylphosphonium halides having a substituted alkyl radical such as 2-carboxyethyl-, 3-bromopropyl- or formylmethyl-triphenylphosphonium bromide. Suitable quaternary ammonium compounds are tetrabutylammonium, benzyltrimethylammonium, methyltributylammonium salts. The compounds mentioned are commercially available and are preferably used in amounts of 0.1 to 5% by weight, based on the powdered copolymer.

The crosslinkable textile binder composition is produced by mixing the powdered components in the stated mixing ratios. Known apparatus for mixing powders can be used for this purpose.

The present invention further provides a process for producing polymer bonded textile moldings or sheet materials from fiber materials by contacting the fiber material with a powdered polymeric binder and consolidating at a temperature of 100° C. to 250° C. and optionally under pressure, which comprises using a crosslinkable powder mixture comprising a) a powdered copolymer obtainable by emulsion polymerization and subsequent drying of one or more monomers selected from the group consisting of vinyl esters, acrylic esters, methacrylic esters, vinylaromatics and vinyl chloride and of 0.01 to 25% by weight, based on the total weight of the copolymer, of one or more ethylenically unsaturated carboxyl-containing monomers, the copolymer having a glass transition temperature Tg or a melting point of greater than 40° C. and a molecular weight Mw of 60,000 to 300,000, and b) at least one powdered compound having two or more epoxide or isocyanate groups and a melting point of 40° C. to 150° C.

The fiber material used is a natural or synthetic raw material. Examples thereof are manufactured based on fiber-forming polymers such as viscose fibers, polyester fibers, polyamide fibers, polypropylene fibers, polyethylene fibers. It is also possible to use glass fibers, ceramic fibers, mineral fibers. Examples of natural fiber materials are wood fibers, cellulose fibers, wool fibers, cotton fibers, jute fibers, flax fibers, hemp fibers, coir fibers, ramie fibers and sisal fibers. The fibers can also be used in the form of woven textiles, in the form of yarns or in the form of nonwovens such as nets or knits. These nonwovens can optionally be mechanically preconsolidated, for example needled.

For fiber bonding, the powder mixture is generally used in an amount of 5 to 30% by weight, based on fiber weight.

The moldings or sheet materials can be produced by mixing the fiber materials with the powder mixture and laying down the mixture of fiber and powder by customary processes of nonwoven technology, for example by means of an airlay, wetlay, direct spinning or carding apparatus, prior to consolidation. The textile sheet material is then bonded by raising the temperature, optionally under pressure.

Alternatively, the fibers are spread out sheetlike prior to consolidation. Processes for this are known and primarily dependent on the use of the consolidated fiber material. The fibers can be laid by means of an airlay, wetlay, direct spinning or carding apparatus, for example. If desired, binder consolidation may be preceded by mechanical consolidation, for example by crosslaying, needling or water jet consolidation. The powder mixture is then sprinkled into the laid fiber material. For this, the powder can be sprinkled in areawise, spotwise or patternedly into part-areas and optionally be introduced into the fiber material by needling. The fiber material is then bonded under heat and optionally pressure.

The powdered textile binder is also useful for producing laminates, in which case two fibrous plies are mutually adhered or one fibrous ply is adhered to a further substrate. This can be done by laying a fibrous ply, the binding powder being mixed in beforehand or sprinkled in after laying, and placing a further fibrous ply on top, for example by airlaying. Instead of the second fibrous ply, a different substrate can be placed on top, for example a plastic film. This is followed by bonding under heat and optionally pressure. This procedure makes available, for example, reclaimed cotton insulating materials durably clad with a fiber web as surfacing material. A further use is the adhering of glass fibers to decorative cover films or cover panels in the sector of building insulation or the production of toecaps by adhering wovens or nonwovens to leather.

The powdered textile binder is particularly useful for producing lofty nonwovens or waddings which are used, for example, as semifinished products for the production of moldings from fiber materials or as padding, cushioning, insulating and filter waddings. To this end, the binding powder is sprinkled into the fiber material and the material is consolidated by heating, preferably in a mold.

In a possible embodiment, the fibrous structures are treated with water or superheated steam after the powder mixture has been mixed or sprinkled in.

The powdered crosslinkable textile binder composition of the present invention differs from aqueous binders in that the energy-intensive drying and the wastewater treatment are avoided. The advantages over prior art powdered binders are that water- and solvent-resistant bonding of the fibers is achieved without the emission of harmful substances, as is the case with phenol-formaldehyde resins or with powders comprising only N-methylolacrylamide as crosslinker.

The examples herein below illustrate the invention.

EXAMPLE 1
Production of a Carboxyl-containing Polymer Powder

A 3 liter capacity reactor was charged with 838.8 g of deionized water and 6.7 g of sodium lauryl sulfate and the contents were heated to 80° C. with stirring under nitrogen. At 80° C., the initiator solution (6.7 g of potassium peroxodisulfate and 218.4 g of water) was introduced into the reactor and the following components were metered into the reactor over 4 hours from separate containers:
Monomer Metering 1
  Methacrylic acid 67.3 g
  Butyl acrylate 403.7 g
  Styrene 861.3 g
  Dodecyl mercaptan 6.7 g
Monomer Metering 2
  Water 67.3 g
  Acrylamide (30%) 44.9 g
Initiator Metering
  Water 217.6 g
  Potassium peroxodisulfate 6.7 g On completion of metering, the polymerization was continued at 80° C. for about 2 hours. After cooling and adjustment of the pH to 8 by means of ammonia, the dispersion was spray dried. The glass transition temperature of this product was 59° C.

EXAMPLE 2
Production of a Carboxyl-containing Polymer Powder

A 3 liter capacity reactor was charged with 855 g of deionized water and 6.7 g of sodium lauryl sulfate and the contents were heated to 80° C. with stirring under nitrogen. At 80° C., the initiator solution (6.7 g of potassium peroxodisulfate and 217.4 g of water) was introduced into the reactor and the following compositions were metered into the reactor over 4 hours from separate containers:

Monomer Metering 1
Methacrylic acid 67.2 g
  Butyl acrylate 403.4 g
  Styrene 860.5 g
  Dodecyl mercaptan 6.7 g
Monomer Metering 2
  Water 67.3 g
  N-Methylolacrylamide (48%) 28.0 g
Initiator Metering
  Water 217.4 g
  Potassium peroxodisulfate 6.6 g On completion of metering, the polymerization was continued at 80° C. for about 2 hours. After cooling and adjustment of the pH to 8 by means of ammonia, the dispersion was spray dried. The glass transition temperature of this product was 59° C.

EXAMPLE 3
Preparation of Powder Mix 98 g of the carboxyl-containing polymer powder of Example 1 were mixed in a powder mixer with 2 g of a powdered multifunctional epoxy compound and also with 0.5 g of triphenylethylphosphonium bromide TEP.

EXAMPLE 4
Preparation of Powder Mix 98 g of the carboxyl-containing polymer powder of Example 2 were mixed in a powder mixer with 2 g of a powdered multifunctional epoxy compound and also with 0.5 g of triphenylethylphosphonium bromide TEP.

EXAMPLE 5

A binding powder based on a redispersible self-crosslinking dispersion powder according to the prior art as represented in WO-A 94/20661 was prepared. This polymer powder was stabilized by means of a polyvinyl alcohol and contained N-methylol groups as crosslinkable groups. The molecular weight (GPC) was about 700,000 g/mol.
Preparation of Fibrous Moldings (With Water)

To produce compression molded panels, 115 g of cotton shoddy were mixed with 13.2 g of binding powder of each of Examples 1 to 5 and spread out on an area 24 by 24 cm. The fiber/powder mixes were additionally moistened with about 40 g of water applied by spraying and immediately thereafter compression-molded at temperatures of about 180° C. for 5 min to produce rigid panels 2 mm in thickness or flexible panels 10 mm in thickness, each having a basis weight of about 2200 g/m$^2$ and a density of about 1115 kg/m$^3$ or 223 kg/m$^3$, respectively.
Preparation of Fibrous Moldings (Dry)

To produce compression molded panels, 115 g of cotton shoddy were mixed with 13.2 g of binding powder of each of the Examples and spread out on an area 24 by 24 cm. The fiber/powder mixes were compression-molded immediately thereafter at temperatures of about 180° C. for 5 min to produce rigid panels 2 mm in thickness or flexible panels 10 mm in thickness, each having a basis weight of about 2200 g/m$^2$ and a density of about 1115 kg/m$^3$ or 223 kg/m$^3$, respectively.
Application Testing
Ultimate Tensile Strength UTS The fibrous compression moldings were punched to form test specimens measuring 10 by 100 mm before testing at room temperature on a Zwick tensile tester similarly to DIN 53857.

Water Regain

To determine the water regain, the dry fibrous moldings (dimensions: 50 by 20 mm) were immersed in water for 1 h or 24 h and the weight increase due to water swelling was determined gravimetrically.

Heat Resistance

To test heat resistance, strips 240 by 20 mm in length were cut. These strips were fixed horizontally on a planar substrate so that the strips overhung the edge of the substrate by 100 mm. In the case of the rigid moldings (panel thickness 2 mm) a 40 g weight was attached, whereas the flexible moldings (panel thickness: 10 mm) were only subjected to the force of gravity of their own weight. The heat resistance was determined by measuring the defection d after one hour at T=120° C.

The results of the application testing are summarized in Tables 1 and 2.

The textile binding powders of the present invention (Examples 3 and 4) exhibit a distinctly higher UTS and an improved heat resistance (=reduced deflection under heat) compared with the uncrosslinked systems (Examples 1 and 2).

Furthermore, the two tables show that Inventive Examples 3 and 4 have an improved ultimate tensile strength at room temperature compared with the prior art (Example 5). True, the heat resistance of the rigid highly compressed 2 mm thick fibrous moldings must be considered equal within the margin of experimental error. In the case of the "waddinglike", flexible fibrous moldings, the heat resistance of the binding powders of the present invention (Examples 3 and 4) is significantly improved over the prior art (Example 5).

When the fibrous moldings are prepared without the addition of water during the compression molding, a distinct improvement (=reduction) in water swelling as compared with the prior art is observed in all cases.

TABLE 1

Testing of rigid moldings
(basis weight: 2200 kg/m², density: 115 kg/m³)

| | Molding molded moist | | | Molding molded dry | | |
|---|---|---|---|---|---|---|
| Example | UTS [N] | Heat resistance [mm] | Water regain 1 h/24 h [% by weight] | UTS [N] | Heat resistance [mm] | Water regain 1 h/24 h [% by weight] |
| Ex. 1 | 390 | 70 | 72/83 | 282 | 70 | 214/238 |
| Ex. 2 | 440 | 66 | 67/83 | 310 | 66 | 198/225 |
| Ex. 3 | 948 | 21 | 48/57 | 560 | 22 | 139/161 |
| Ex. 4 | 926 | 19 | 51/60 | 526 | 20 | 159/180 |
| Ex. 5 | 326 | 20 | 68/79 | 165 | 41 | 253/284 |

TABLE 2

Testing of flexible moldings
(basis weight: 2200 kg/m², density: 223 kg/m³)

| | Molding molded moist | | | Molding molded dry | | |
|---|---|---|---|---|---|---|
| Example | UTS [N] | Heat resistance [mm] | Water regain 1 h/24 h [% by weight] | UTS [N] | Heat resistance [mm] | Water regain 1 h/24 h [% by weight] |
| Ex. 1 | 15.2 | 16 | 602/621 | 15.4 | 15 | 728/739 |
| Ex. 2 | 16.3 | 14 | 509/550 | 16.2 | 14 | 730/741 |
| Ex. 3 | 18.8 | 8 | 441/447 | 18.3 | 11 | 758/774 |
| Ex. 4 | 17.9 | 7 | 423/439 | 18.8 | 8 | 721/752 |
| Ex. 5 | 11.9 | 14 | 589/662 | 7.9 | 39 | 987/994 |

What is claimed is:

1. A powdered crosslinkable textile binder composition for producing polymer bonded textile moldings or sheet materials, comprising a) a powdered copolymer obtained by emulsion polymerization and subsequent drying of one or more monomers selected from the group consisting of vinyl esters, acrylic esters, methacrylic esters, vinylaromatics and vinyl chloride and of 0.01 to 25% by weight, based on the total weight of the copolymer, of one or more ethylenically unsaturated carboxyl-containing monomers, the copolymer having a glass transition temperature Tg or a melting point of greater than 40° C. and a molecular weight Mw of 60,000 to 300,000, and b) at least one powdered compound having two or more epoxide or isocyanate groups and a melting point of 40° C. to 150° C.

2. The powdered crosslinkable textile binder composition of claim 1, wherein the copolymer used is a copolymer selected from the group consisting of vinyl acetate/vinyl chloride copolymer, vinyl acetate/vinyl ester of a branched, saturated, 5-carbon monocarboxylic acid copolymer, vinyl acetate/vinyl ester of a branched, saturated, 9-carbon monocarboxylic-acid copolymer, methyl methacrylate/butyl acrylate copolymer and styrene/butyl acrylate copolymer, each containing 0.01 to 25% by weight of the carboxyl-containing monomer units mentioned.

3. The powdered crosslinkable textile binder composition of claim 1, wherein the carboxyl-containing monomer units are selected from the group consisting of acrylic acid, methacrylic acid, maleic acid, fumaric acid and itaconic acid.

4. The powdered crosslinkable textile binder composition of claim 1, wherein the copolymer further contains 0.01 to 10.0% by weight, based on the total weight of the copolymer, of one or more monomers selected from the group consisting of the ethylenically unsaturated carboxamides, the ethylenically unsaturated sulfonic acids and salts thereof, the multiply ethylenically unsaturated comonomers and the N-methylol(meth) acrylamides and also their ethers.

5. The powdered crosslinkable textile binder composition of claim 1, comprising acrylic acid and/or acrylamide in an amount of 0.01 to 2% by weight each.

6. A process for producing polymer bonded textile moldings or sheet materials from fiber materials by contacting the fiber material with the powdered polymeric binder of claim 1 and consolidating at a temperature of 100° C. to 250° C. and optionally under pressure, said binder being a crosslinkable powder mixture.

7. The process of claim 6, wherein the fiber material comprises one or more material selected from the group consisting of viscose fibers, polyester fibers, polyamide fibers, polypropylene fibers, polyethylene fibers, glass fibers, ceramic fibers, mineral fibers, wood fibers, cellulose fibers, wool fibers, cotton fibers, jute fibers, flax fibers, hemp fibers, coir fibers, ramie fibers and sisal fibers in the form of woven textiles, in the form of yarns or in the form of nonwovens such as nets or knits.

8. The process of claim 6, wherein the crosslinkable powder mixture is used in an amount of 5 to 30% by weight, based on fiber weight.

9. The process of claim 6, wherein the fibrous structures are treated with water or superheated steam after the powder mixture has been mixed or sprinkled in.

10. A powdered crosslinkable textile binder composition for producing polymer bonded textile moldings or sheet materials, comprising
   a) a powdered copolymer obtained by emulsion polymerization and subsequent drying of one or more monomers selected from the group consisting of vinyl esters, acrylic esters, methacrylic esters, vinylaromatics and vinyl chloride and 0.01 to 25% by weight, based on the total weight of the copolymer, of one or more ethylenically unsaturated carboxyl-containing monomers, the copolymer having a glass transition temperature Tg or a melting point of greater than 40° C. and a molecular weight Mw of 60,000 to 300,000
   b) at least one powdered compound having two or more epoxide or isocyanate groups and a melting point of 40° C. to 150° C., and
   c) 0.1 to 5% by weight, based on the powdered copolymer, of a powdered crosslinking catalyst.

11. A powdered crosslinkable textile binder composition for producing polymer bonded textile moldings or sheet materials, comprising
   a) a powdered copolymer obtained by emulsion polymerization and subsequent drying of one or more monomers selected from the group consisting of vinyl esters, acrylic esters, methacrylic esters, vinylaromatics and vinyl chloride and from 0.01 to 15% by weight, based on the total weight of the copolymer, of one or more ethylenically unsaturated carboxyl-containing monomers, said copolymer having a glass transition temperature Tg or a melting point greater than 40° C. and a molecular weight MW of 60,000 to 300,000, and wherein the copolymer further contains 0.01 to 10.0% by weight, based on the total weight of the copolymer, of one or more monomers selected from the group consisting of the ethylenically unsaturated carboxamides, the ethylenically unsaturated sulfonic acids and salts thereof, the multiply ethylenically unsaturated comonomers and the N-methylol(meth) acrylamides and also their isobutoxy or m-butoxy ethers and
   b) at least one powdered compound having two or more epoxide or isocyanate groups and a melting point of 40° C. to 150° C.

12. A textile molding or sheet material which has been bonded by the powdered crosslinkable textile binder composition of claim 10.

13. A textile molding or sheet material which has been bonded by the powdered crosslinkable textile binder composition of claim 11.

* * * * *